United States Patent [19]

Rhee

[11] 3,730,989

[45] May 1, 1973

[54] TELEVISION HORIZONTAL TRANSISTOR OSCILLATOR AND AFC NETWORK

[75] Inventor: Dong Woo Rhee, Williamsville, N.Y.

[73] Assignee: GTE Sylvania Incorporated, Seneca Falls, N.Y.

[22] Filed: Dec. 13, 1971

[21] Appl. No.: 207,216

[52] U.S. Cl. .........178/7.5 R, 178/69.5 TV, 331/1 R, 331/8, 331/18, 331/108 R, 331/117 R

[51] Int. Cl. .........H04n 5/04, H03b 3/04, H03b 5/12

[58] Field of Search ........................178/7.3 R, 7.5 R, 178/69.5 TV; 331/1 R, 8, 10, 17, 18, 108 R, 117 R

[56] References Cited

UNITED STATES PATENTS 3,460,052 8/1969 Rader et al. ............................331/10

OTHER PUBLICATIONS

"An Integrated Circuit for Chrominance Signal Processing in Color–TV Receivers," by Gary Kelson, IEEE Trans. Broadcast & TV Rec'rs., Vol. BTR–16 No. 3, August 1970, PP 196–202

*Primary Examiner*—Robert L. Griffin
*Assistant Examiner*—George G. Stellar
*Attorney*—Norman J. O'Malley et al.

[57] ABSTRACT

The oscillator includes first and second transistors and first and second resistors serially connected between the emitters of the first and second transistors, the base of the first transistor is connected to receive a control voltage and the base of the second transistor is biased at a reference voltage, a third transistor is connected to the common junction of the first and second resistors, a positive feedback circuit is connected from the collector of one of the first and second transistors to the third transistor, and a capacitor is connected between the collectors of the first and second transistors. The AFC network receives an output derived from the oscillator output and with two integrators of different time constants generates two signals which are fed to a switching phase comparator together with a reference synchronizing signal to generate the oscillator control signal.

10 Claims, 4 Drawing Figures

TELEVISION HORIZONTAL TRANSISTOR OSCILLATOR AND AFC NETWORK

BACKGROUND OF THE INVENTION

This invention relates to controlled oscillators and more particularly to controlled oscillators adapted for integration on a monolithic semiconductor chip.

The prior art discloses many forms of frequency and phase controlled oscillators and control circuits therefor. Such circuits are used in a variety of applications one of which is to generate pulses synchronized with a signal received by a television receiver for driving deflection apparatus associated with a cathode ray tube display device.

Oscillators used in such systems and in similar systems can be directly triggered by received synchronizing pulses, however, especially in the case of the horizontal oscillator in a television receiver, direct triggering is undesirable because the oscillator is susceptible to being triggered by noise. A preferred form of frequency control of the horizontal oscillator has heretofore been a doubly balanced detector which derives a control voltage from the flyback pulses and synchronizing pulses. Such doubly balanced detectors provide more satisfactory noise immunity than directly triggered oscillators, however, it is difficult to design such circuits to provide the necessary balanced output for satisfactory frequency control. Prior art doubly balanced detectors are also difficult to produce in integrated form.

Other frequency control circuits and oscillators known in the prior art suffer from one or more disadvantages such as lack of stability, poor frequency and phase control, high cost, poor performance, and similar disadvantages. Also, most prior art circuits are not susceptible to integration on a monolithic semi-conductor chip. Other prior art circuits that are susceptible to integration suffer from disadvantages such as excessive complexity, large numbers of external connections, and other similar disadvantages.

OBJECTS AND SUMMARY OF THE INVENTION

Accordingly, it is a primary object of this invention to obviate the above noted and other disadvantages of the prior art.

It is a further object of this invention to provide a controlled oscillator susceptible of integration on a monolithic semiconductor chip.

It is a further object of this invention to provide a frequency control circuit that readily provides a balanced output.

It is a further object of this invention to provide a frequency and phase controlled oscillator with enhanced stability. These objects and other objects and advantages are achieved in one aspect of this invention in a controlled oscillator circuit including an oscillator, feedback means, integrating means, switching means, and loop filter. The feedback means is connected to the oscillator for providing a feedback signal including pulses indicative of the frequency and phase of oscillation of the oscillator. The integrating means is connected to the feedback means for receiving the feedback pulses to provide a first voltage representative of the average value of the feedback signal and a second voltage that varies about the average value of the feedback signal in response to the pulses included in the feedback signal. The switching means is connected to receive the periodic reference pulses and the first and second voltages. The switching means provides an output pulse of a first polarity when the first voltage is less than the second voltage during one of the reference pulses and provides an output pulse of a second polarity when the first voltage is greater than the second voltage during one of the reference pulses. The loop filter is connected between the switching means and the oscillator and provides a control voltage to control the oscillation of the oscillator in response to the output pulses from the switching means.

In another aspect of this invention the above noted and other objects and advantages are achieved in a circuit for use in a television receiver which has a signal processing channel for processing a received composite television signal to provide signals for application to a cathode ray tube display device, deflection apparatus for deflecting an electron beam in the cathode ray tube display device in at least two directions, and synchronizing pulse separating means connected to the signal processing channel for separating synchronizing pulses from a signal in the signal processing channel. The circuit synchronizes the deflection of the electron beam by the deflecting apparatus in at least one of the directions to the synchronizing pulses and includes phase detecting means and an oscillator. The phase detecting means is connected to the synchronizing pulse separating means and to the deflection apparatus to provide a control voltage proportional to the phase difference between feedback pulses from the deflection apparatus and the synchronizing pulses. The oscillator includes a transistor means connected to the deflection apparatus which oscillates between first and second operating states. The oscillator further includes first and second transistors each having an input, an output, and an emitter. The input of the first transistor is connected to the phase detecting means for receiving the control voltage. The input of the second transistor is connected to a source of reference voltage. First and second resistors are connected between the emitters of the first and second transistors, respectively, and the transistor means. A capacitor is connected between the outputs of the first and second transistors, and a positive feedback means is connected between the output of one of the first and second transistors and the transistor means to cause oscillation of the transistor means.

DETAILED DESCRIPTION OF THE PREFERRED EMBODIMENTS

For a better understanding of the present invention, together with other and further objects, advantages, and capabilities thereof, reference is made to the following disclosure and appended claims in connection with the above-described drawings.

The invention will be described with reference to the horizontal oscillator and automatic frequency control of a television receiver. Those skilled in the art will realize, however, that the invention can be adapted for other uses as well.

Figure 1:
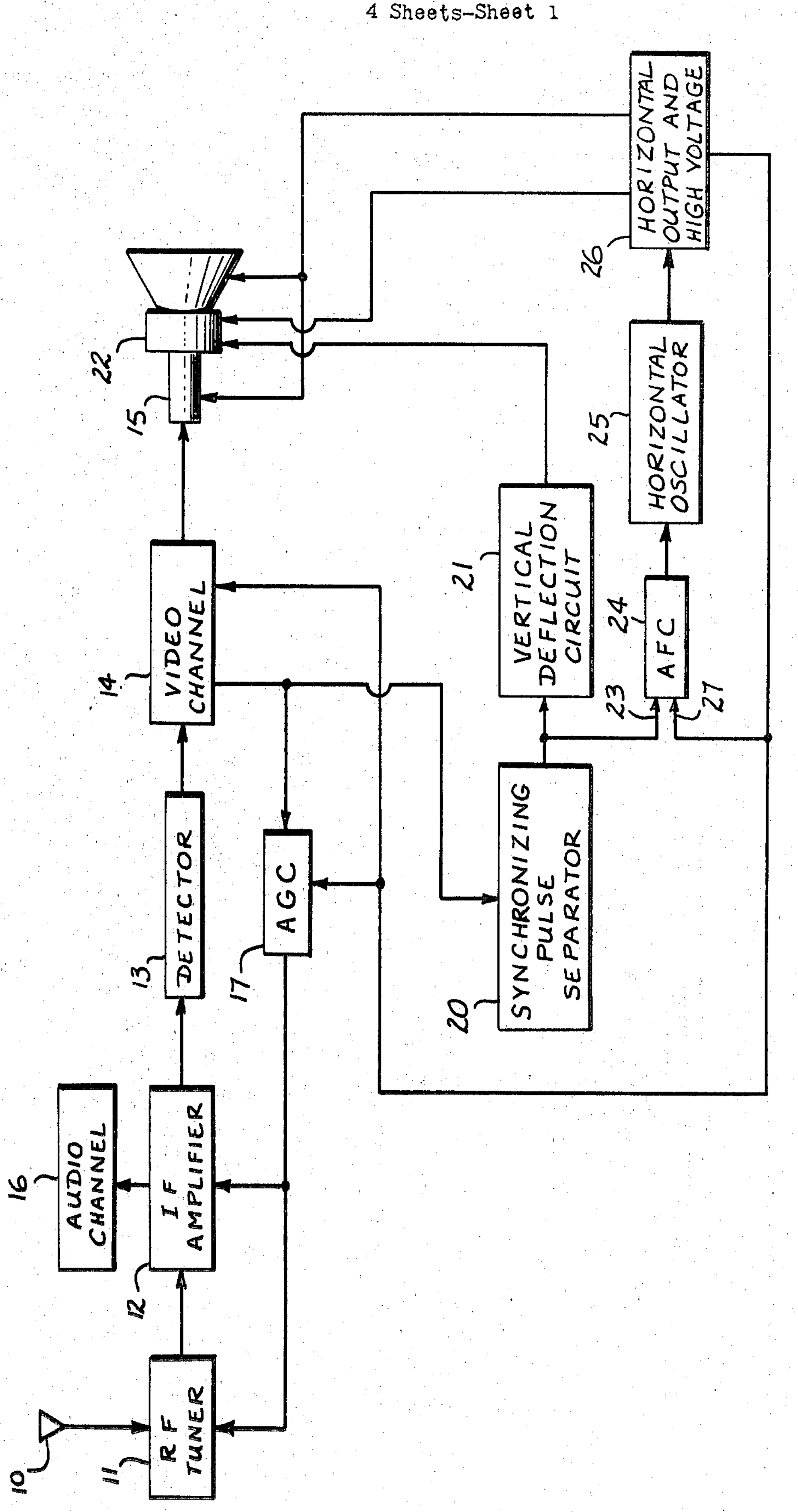
FIG. 1 is a block diagram of a typical television receiver in which the invention is adapted for use.

FIG. 1 illustrates a typical television receiver in which the invention can be used. An antenna 10 intercepts or receives a composite television signal which includes the usual video information and synchronizing or reference pulses. Antenna 10 is connected to a signal processing channel that includes an RF tuner 11 that heterodynes the received signal to IF frequencies, an IF amplifier 12 that amplifies and filters the signal, a detector 13 that detects the composite video signal, and a video channel 14 that amplifies or processes the composite video signal for application to a cathode ray tube (CRT) display device 15. An audio channel 16 receives and processes the audio portion of the received signal, for example, from IF amplifier 12.

An output from video channel 14 couples the composite video signal to an automatic gain control (AGC) 17 and to a synchronizing pulse separating means 20. An output of AGC 17 is coupled to RF tuner 11 and IF amplifier 12 to control the gain thereof. Synchronizing pulse separator 20 separates or clips the synchronizing pulses from the composite video signal for application to the deflection apparatus which deflects the electron beam or beams in CRT 15. An output of synchronizing pulse separator 20 is coupled to a vertical deflection circuit 21 which has an output coupled to the vertical windings of a deflection yoke 22 positioned in the usual manner around the neck of CRT 15.

The output of synchronizing pulse separator 20 is further coupled to an input 23 of an automatic frequency control circuit (AFC) 24. An output of AFC 24 is connected to an input of a horizontal oscillator 25 which has an output connected to a horizontal output and high voltage circuit 26. The horizontal output circuit includes the usual horizontal output stage and horizontal output transformer for developing horizontal deflection signals for application to the horizontal windings of yoke 22. The high voltage circuit develops the usual high voltages for application to CRT 15. A feedback signal including pulses indicative of the frequency and phase of oscillation of oscillator 25 is coupled from the horizontal output circuit to an input 27 of AFC 24. These feedback pulses are ordinarily obtained from the horizontal output transformer and are called flyback pulses. The flyback pulses are also coupled to AGC 17 to key AGC 17 and, in the case of a color television receiver, to the chrominance section of video channel 14.

AFC 24 includes a phase detecting means that compares the phases of the received synchronizing pulses and the flyback pulses and provides a control voltage proportional to the phase difference. The control voltage is coupled to oscillator 25 to control or synchronize the frequency and phase of oscillator 25 to the received synchronizing pulses.

Figure 2:
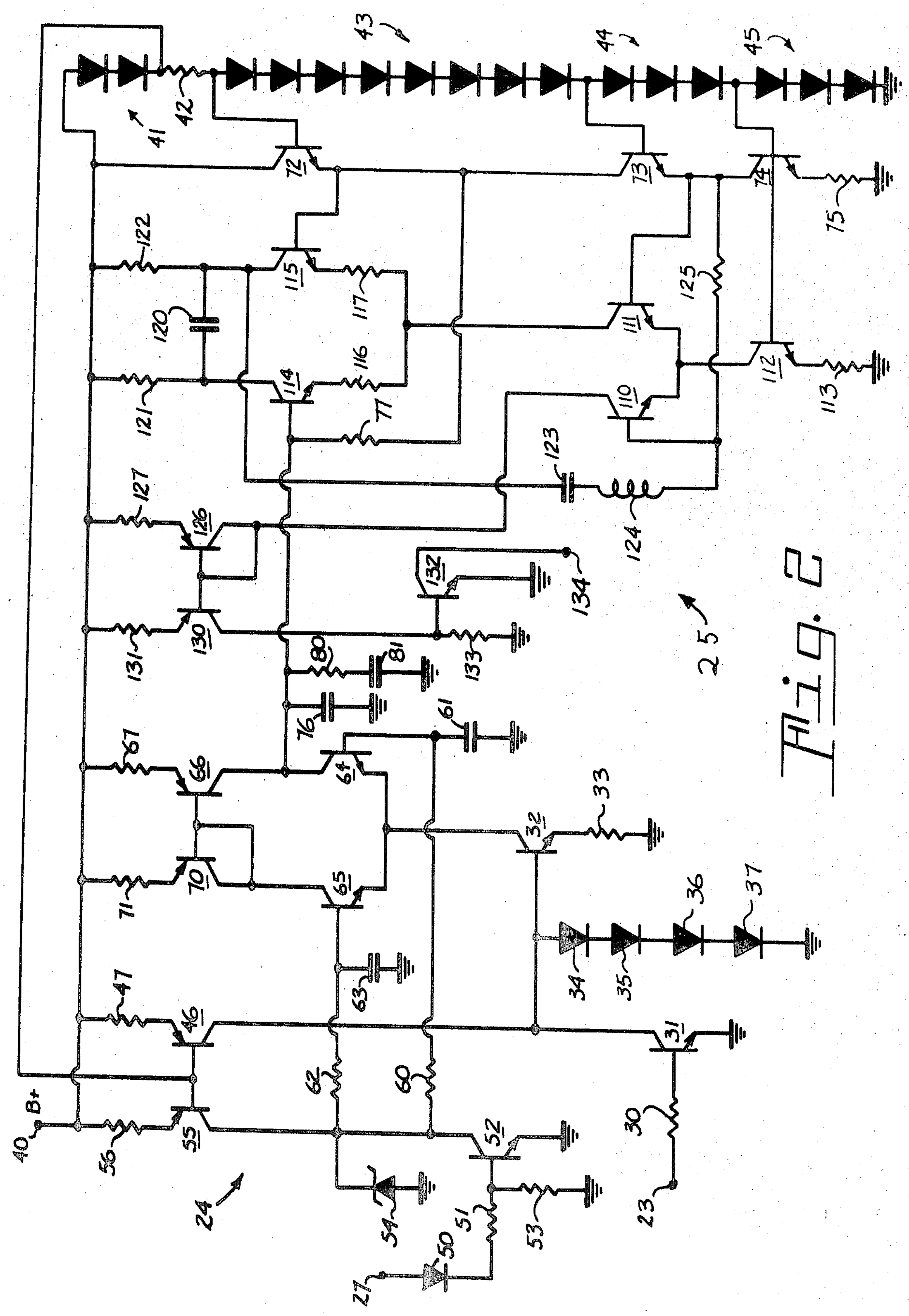
FIG. 2 is a schematic diagram of one embodiment of the invention.

FIG. 2 is a schematic illustration of one embodiment of AFC 24 and oscillator 25. In FIG. 2 the reference or synchronizing pulses are coupled from terminal 23 via a resistor 30 to the base of a transistor 31. The emitter of transistor 31 is connected to a common conductor illustrated as ground. The collector of transistor 31 is connected to the base of a transistor 32 which has an emitter connected via a resistor 33 to ground. Four diodes 34–37 are connected in series between the base of transistor 32 and ground to limit the signal amplitude at the base of transistor 32.

A source of supply voltage illustrated as a terminal 40 is connected to a chain of diodes to provide a number of lower reference potentials. The chain of diodes includes two diodes 41 series connected between source 40 and a resistor 42. Eight diodes 43 are series connected between resistor 42 and another series connection of three diodes 44. Diodes 44 are connected between diodes 43 and a series connection of three diodes 45. Diodes 45 are connected between diodes 44 and ground. Since each diode drops about 0.7 volt when forward biased, a number of reference voltages are provided.

The junction of diodes 41 and resistor 42 is connected to the base of a transistor 46 which has its emitter connected via a resistor 47 to source 40 and its collector connected to the collector of transistor 31.

Terminal 27 is connected via a diode 50 is series with a resistor 51 to the base of a transistor 52. The base of transistor 52 is connected to ground by a resistor 53 and the emitter of transistor 52 is connected to ground. The collector of transistor 52 is connected to ground via a voltage reference means illustrated as a zener diode 54. The collector of transistor 52 is further connected to the collector of a transistor 55 which has its emitter connected via a resistor 56 to source 40 and its base connected to the junction of diodes 41 and resistor 42.

A resistor 60 and a capacitor 61 are connected in series between the collector of transistor 52 and ground. A resistor 62 and a capacitor 63 are also connected in series between the collector of transistor 52 and ground. The junction between resistor 60 and capacitor 61 is connected to the base of a transistor 64, and the junction between resistor 62 and capacitor 63 is connected to the base of a transistor 65. The emitters of transistors 64 and 65 are connected together and to the collector of transistor 32. The collector of transistor 64 is connected to the collector of a transistor 66, the emitter of which is connected by a resistor 67 to source 40. The collector of transistor 65 is connected to the collector of a transistor 70 which has an emitter connected by a resistor 71 to source 40. The collector of transistor 70 is connected to the bases of transistors 66 and 70.

Source 40 is connected to the collector of a transistor 72 which has its base connected to the junction of resistor 42 and diodes 43. The emitter of transistor 72 is connected to the collector of a transistor 73 which has its base connected to the junction between diodes 43 and 44. The emitter of transistor 73 is connected to the collector of a transistor 74 which has its base connected to the junction between diodes 44 and 45. The emitter of transistor 74 is connected via a resistor 75 to ground. Transistors 72, 73, and 74 supply current to the various circuit components in response to the bias voltages developed by the diode chain.

The collector of transistor 64 is connected by a capacitor 76 to ground and by a resistor 77 to the emitter of transistor 72. A resistor 80 is connected in series with a capacitor 81 between the collector of transistor 64 and ground. Capacitors 76 and 81 and resistors 77 and 80 comprise a loop filter between the phase detector and oscillator. The disclosed form of loop filter is preferred because this loop filter requires only one external pin on an integrated circuit package to which resistor 80 and capacitors 76 and 81 are connected.

Figure 3:
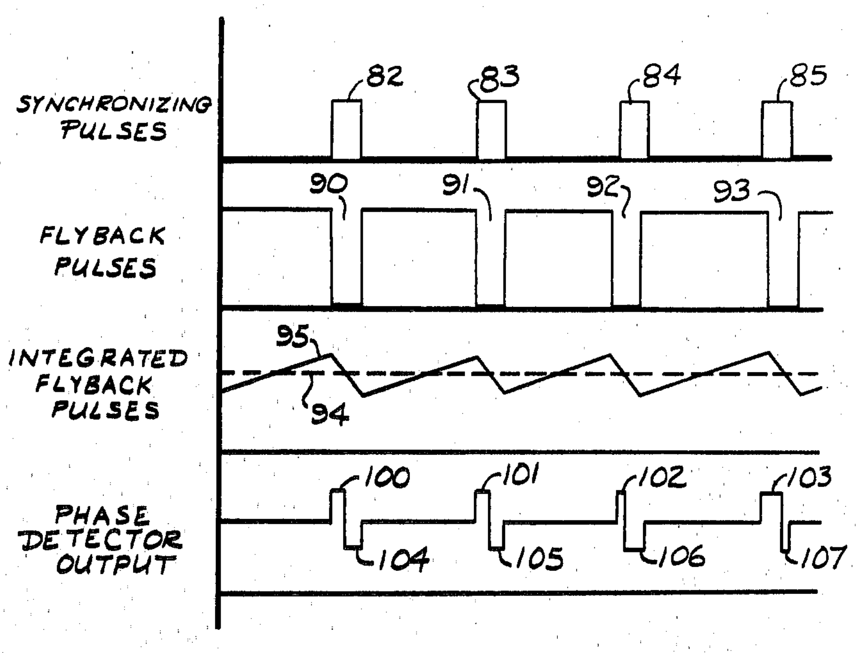
FIG. 3 is a timing diagram to aid in explaining the operation of the invention.

The operation of the AFC circuit will be described with reference to the timing diagram of FIG. 3. Reference pulses such as negative-going synchronizing pulses of a television receiver are coupled to terminal 23. The synchronizing pulses are coupled via resistor 30 to the base of transistor 31. Transistor 31 inverts the synchronizing pulses to provide positive-going synchronizing pulses 82–85 of FIG. 3 at the base of transistor 32. A feedback signal including pulses such as positive-going flyback pulses is coupled to terminal 27. The flyback pulses are coupled via diode 50 and resistor 51 to the base of transistor 52. Transistor 52 inverts the flyback pulses to provide negative-going flyback pulses 90–93 of FIG. 3 at the collector of transistor 52. Zener diode 54 limits the positive amplitude of the voltage at the collector of transistor 52. The current supplies for transistors 31 and 52 are provided by transistors 46 and 55, respectively, which are biased as current sources and act as active loads for transistors 31 and 52.

The signal at the collector of transistor 52 is integrated or filtered by resistor 60 and capacitor 61 which act as an integrator or averaging circuit with a long time constant. The voltage developed across capacitor 61 and hence at the base of transistor 64 is the average value of the collector voltage of transistor 52. This voltage is represented by dashed line 94 of FIG. 3. Resistor 62 and capacitor 63 also integrate the voltage at the collector of transistor 52, but since the time constant of resistor 62 and capacitor 63 is relatively short, a sawtooth voltage that varies about the average value of the voltage at the collector of transistor 52 is developed at the base of transistor 65. This sawtooth voltage is illustrated by waveform 95 of FIG. 3. Thus, resistors 60 and 62 and capacitors 61 and 63 are an integrating means which provides a voltage representative of the average value of the feedback signal at the base of transistor 64 and a voltage that varies about the average value of the feedback signal at the base of transistor 65.

Transistor 32 is normally OFF so that transistors 64 and 65 are normally non-conducting. When a synchronizing pulse occurs, transistor 32 switches ON. As is indicated in FIG. 3, during the first part of the synchronizing interval the voltage at the base of transistor 65 is greater than the voltage at the base of transistor 64. Thus, transistor 65 switches ON and transistor 64 switches OFF. The voltage at the collector of transistor 65 drops to turn transistors 66 and 70 ON and current flows from source 40 through resistor 67 and transistor 66 into the loop filter. Thus, a positive-going current pulse is produced at the collectors of transistors 64 and 66. Transistor 66 accordingly acts as a current source to produce positive pulses 100–103 of FIG. 3 during synchronizing intervals when the voltage at the base of transistor 64 is less than the voltage at the base of transistor 65.

During the synchronizing interval, the voltage at the base of transistor 65 decreases until during the latter part of the interval it is less than the voltage at the base of transistor 64. Thus, transistor 65 switches OFF and transistor 64 switches ON. Since transistor 65 is OFF, transistors 66 and 70 are turned OFF and current flows out of the loop filter through transistors 64 and 32 generating a negative-going current pulse. This action produces negative pulses 104–107 of FIG. 3. Note that pulses 100–107 have positive or negative voltages with respect to a reference level which is determined by the bias supplied via the emitter of transistor 72 and resistor 77.

Pulses 100–107 are filtered by the loop filter to provide a control voltage to the oscillator. If the flyback pulses lead the synchronizing pulses, the positive pulses at the collector of transistor 64 is of a shorter duration than the negative pulses thereby causing the control voltage to decrease. This operation is illustrated by pulses 84, 92, 102, and 106 of FIG. 3. The decrease in control voltage slows the oscillator to bring it back in synchronism with the received synchronizing pulses.

Pulses 85, 93, 103, and 107 illustrate the operation when the flyback pulses lag the synchronizing pulses. Pulses 103 and 107 are filtered by the loop filter to increase the control voltage to increase the speed of the oscillator. Note that if the flyback pulses and synchronizing pulses are totally out of phase, pulses of only one polarity will be provided at the collector of transistor 64 until the oscillator is approximately in synchronism with the synchronizing pulses. It should be noted that while the synchronizing pulses and the flyback pulses are illustrated as being of approximately equal duration, the circuit will operate as described when the two sets of pulses are of unequal widths as well.

Transistors 32, 64, and 65 thus comprise a switching means which receives the reference or synchronizing pulses and the voltages from the integrating means. The switching means provides an output pulse at the collector of transistor 640 of a first polarity when the voltage at the base of transistor 64 is less than the voltage at the base of transistor 65 during a reference pulse interval and provides an output pulse of a second polarity when the voltage at the base of transistor 64 is greater than the voltage at the base of transistor 65 during a reference pulse interval.

The frequency and phase control circuit (AFC 24) provides a balanced input and a balanced output. An automatically balanced input is provided because the same feedback signal is used to develop the voltages at the bases of transistors 64 and 65 so that changes in the feedback signal are cancelled or compensated. The output is balanced, that is, equal positive or negative control voltages for equal phase errors are provided and zero control voltage is provided when the phase error is zero. The output of the phase detector at the collectors of transistors 64 and 66 is controlled current pulses which are relatively insensitive to variations in supply voltage and the reference or bias voltage supplied by transistor 72.

Oscillator 25 includes a transistor means including transistors 110 and 111. The emitters of transistors 110 and 111 are connected together to the collector of a transistor 112 which has a base connected to the junction between diodes 44 and diodes 45. The emitter of transistor 112 is connected via a resistor 113 to ground. Oscillator 25 also includes control transistors 114 and 115. The base of transistor 114 is connected to the output of the loop filter to receive the control voltage. The base of transistor 115 is connected to the emitter of transistor 72 to receive a bias or reference voltage which is approximately equal to the normal or average value of the control voltage when the oscillator is synchronized. The emitter of transistor 114 is connected by a resistor 116 to the collector of transistor 111. The emitter of transistor 115 is connected by a resistor 117 to the collector of transistor 111. A capacitor 120 is connected between the collectors of transistors 114 and 115. The collector of transistor 114 is connected via a resistor 121 to source 40 while the collector of transistor 115 is connected via a resistor 122 to source 40.

A positive feedback means including a capacitor 123 connected in series with an inductor or coil 124 is connected between the collector of transistor 115 and the base of transistor 110. The base of transistor 110 is further connected by a damping and bias resistor 125 to the emitter of transistor 73 which is further connected to the base of transistor 111.

The collector of transistor 110 is connected to the collector of a transistor 126, the emitter of which is connected via a resistor 127 to source 40. The collector of transistor 126 is connected to the base of transistor 126 and to the base of a transistor 130 which has an emitter connected via a resistor 131 to source 40. The collector of transistor 130 is connected to the base of a transistor 132 and to ground via a resistor 133. The emitter of transistor 132 is connected to ground and the collector is connected to an output terminal 134 which comprises the output of oscillator 25.

To explain the operation of oscillator 25, assume that there is no control voltage at the base of transistor 114, that is, the bases of transistors 114 and 115 are biased at approximately equal potentials. Thus, approximately equal currents flow through transistors 114 and 115. Transistor 112 is biased in a conductive mode and operates as a current source for transistors 110 and 111. Assume that transistor 110 is conducting. Transistor 111 is driven toward cut-off to reduce the current through transistors 114 and 115. Positive feedback from the collector of transistor 115 is coupled through capacitor 123 and coil 124 to the base of transistor 110. Capacitor 123 and coil 124 oscillate to drive transistor 110 toward cut-off and transistor 111 toward full conduction. Positive feedback from the collector of transistor 115 causes the cycle to repeat.

Sine transistor 110 oscillates between cut-off and full conduction, transistor 126 also oscillates between cut-off and full conduction. Since the base drive for transistor 130 is supplied by the collector of transistor 126, transistor 130 oscillates also thereby switching transistor 132 to drive the horizontal output circuitry. The frequency of oscillation is determined by capacitor 123 and coil 124 together with the various resistors connected thereto. The frequency of oscillation can be adjusted, for example, by tuning coil 124 which can be used as a horizontal hold control, if desired.

Next assume that the control voltage increases. Transistor 114 is driven further into conduction thereby driving transistor 115 toward cut-off. Thus, the positive feedback is supplied from the collector of transistor 114 via capacitor 120 instead of from the collector of transistor 115. The capacitance of the tank circuit is decreased by placing capacitor 120 in series with capacitor 123 thereby increasing the frequency of oscillation unit oscillator 25 is synchronized with the received synchronizing pulses. When the control voltage decreases, the conduction of transistor 114 is decreased toward cut-off. Thus, capacitor 120 is placed in series with resistor 121 and in parallel with resistor 122. This combination is in series with the tank circuit and effectively reduces the frequency of oscillator 25.

Resistors 116 and 117 compensate for the base-to-emitter offset voltages of transistors 114 and 115. Without resistors 116 and 117 a difference or error in the offset voltages is amplified to provide an amplified error at the collectors of transistors 114 and 115. Such differences in offset voltages can be due to manufacturing tolerances or errors and due to operational differences. For example, the temperature coefficient of transistors 114 and 115 may be slightly different thereby causing a difference in offset voltages with temperature changes. Resistors 116 and 117 operate to reduce the error due to the offset voltages that would otherwise appear at the collectors of transistors 114 and 115, thereby stabilizing the oscillator to provide an oscillator with exceptional stability.

The biasing for both transistors 114 and 115 is provided internally thereby requiring no external connections. In addition, the control voltage provided by the loop filter requires only one external connection. Since a main source of circuit failure is external connections, minimizing the number of external connections increases reliability as well as decreasing cost and complexity. Also, since the bias voltage for transistors 114 and 115 are both derived from the same source, i.e., the emitter of transistor 72, changes in the bias level tend to be compensated.

Figure 4:
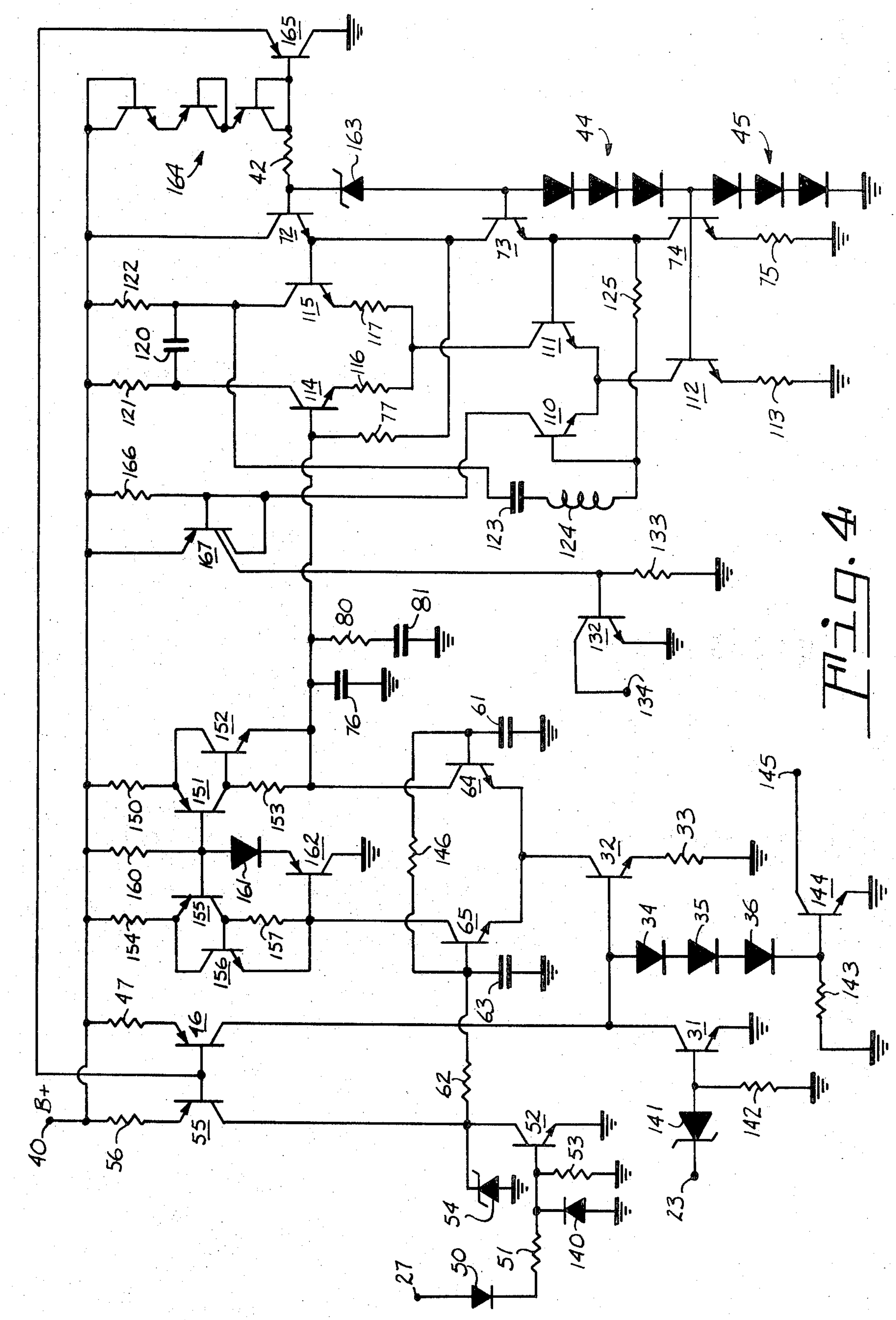
FIG. 4 is a schematic diagram of another embodiment of the invention.

FIG. 4 is a schematic illustration of another embodiment of the invention. Since the embodiment of FIG. 4 is similar to the embodiment of FIG. 2, the same reference numerals have been used except where components were changed. Only the differences between FIGS. 2 and 4 will be described. In FIG. 4 a protective diode 140 is added in parallel with resistor 53 at the base of transistor 52. A zener diode 141 is connected between terminal 23 and the base of transistor 31 instead of resistor 30 and a resistor 142 is connected between the base of transistor 31 and ground. Diode 37 at the base of transistor 32 is deleted and the cathode of diode 36 is connected to ground via a resistor 143. The junction between diode 36 and resistor 143 is connected to the base of a transistor 144 which has an emitter connected to ground and a collector connected to a terminal 145. The synchronizing pulses are thereby coupled to terminal 145 which can be coupled, for example, to the vertical oscillator.

A resistor 146 is connected between the base of transistors 65 and 64 to replace resistor 60. Thus, resistor 146 and capacitor 61 integrate or filter the sawtooth voltage at the base of transistor 65 to provide a reference or bias at the base of transistor 64.

Transistors 66 and 70 and resistors 67 and 71 are replaced by a different circuit. Source 40 is connected via a resistor 150 to the emitter of a transistor 151. The collector of transistor 151 is connected to the base of a transistor 152, the collector of which is connected to the emitter of transistor 151. The emitter of transistor 152 is connected to the collector of transistor 64 which is further connected via a resistor 153 to the collector of transistor 151. Source 40 is further connected via a resistor 154 to the emitter of a transistor 155 which has a collector connected to the base of a transistor 156. The collector of transistor 156 is connected to the emitter of transistor 155, while the emitter of transistor 156 is connected to the collector of transistor 65. The collector of transistor 65 is connected via a resistor 157 to the collector of transistor 155. Source 40 is connected via a resistor 160 to the bases of transistors 151 and 155 which are further connected via a diode 161 to the emitter of transistor 162. The collector of transistor 162 is connected to ground and the base is connected to the collector of transistor 65.

In operation, transistors 151 and 152 act as a composite PNP transistor equivalent to transistor 66 of FIG. 2, while transistors 155 and 156 are equivalent to transistor 70. Transistor 162 provides base bias for transistors 151 and 155, and resistor 160 aids in turning transistor 151 OFF. The operation of the circuit of FIG. 4 is basically the same as that described for the equivalent circuit of FIG. 2.

In the chain of biasing diodes, diodes 43 are replaced by a zener diode 163. Diodes 41 are replaced by three series connected transistors 164 with the collector of each connected to the base. The junction of transistors 164 and resistor 42 is connected to the base of a transistor 165 which has a ground collector and an emitter connected to the bases of transistors 46 and 55.

Transistor 126 and 130 and resistors 127 and 131 are replaced by a resistor 166 and a transistor 167 having two collectors. Source 40 is connected to the emitter of transistor 167 and via resistor 166 to the base. The base is further connected to the first collector of transistor 167 and to the collector of transistor 110. The second collector of transistor 167 is connected to the base of transistor 132. Transistor 167 switches ON and OFF in response to the oscillation of transistor 110 to correspondingly switch transistor 132 ON and OFF.

Accordingly, there has been described the preferred embodiments of a frequency and phase controlled oscillator which exhibits numerous advantages over the prior art. The circuitry is susceptible to an integration on a monolithic semiconductor chip to provide a compact, inexpensive, and highly reliable component which exhibits exceptional stability and good performance. The control circuit provides a balanced output without undue complexity, thereby providing good frequency and phase control.

While there have been shown and described what is at present considered the preferred embodiments of the invention, it will be obvious to those skilled in the art that various changes and modifications may be made therein without departing from the scope of the invention as defined by the appended claims.

What is claimed is:

1. A controlled oscillator circuit comprising: an oscillator;

feedback means connected to said oscillator for providing a feedback signal including pulses indicative of the frequency and phase of oscillation of said oscillator;

integrating means connected to said feedback means for receiving said feedback pulses for providing a first voltage representative of the average value of said feedback signal and a second voltage that varies about said average value of said feedback signal in response to the pulses included in said feedback signal;

switching means connected to receive periodic reference pulses and said first and second voltages for providing an output pulse of a first polarity when said first voltage is less than said second voltage during one of said reference pulses and for providing an output pulse of a second polarity when said first voltage is greater than said second voltage during one of said reference pulses; and a loop filter connected between said switching means and said oscillator for providing a control voltage to control the oscillation of said oscillator in response to the output pulses from said switching means.

2. A circuit as defined in claim 1 wherein said second voltage has a sawtooth waveform.

3. A circuit as defined in claim 1 wherein said switching means includes first and second transistors connected as a differential stage, said first voltage is coupled to said first transistor and said second voltage is coupled to said second transistor, and a third transistor connected to the emitters of said first and second transistors and further connected to receive said reference pulses for switching said third transistor to a conducting condition.

4. A circuit as defined in claim 3 wherein said integrating means includes a first integrator connected to said first transistor and a second integrator connected to said second transistor.

5. A circuit as defined in claim 1 wherein said oscillator includes first and second transistors and first and second resistors serially connected between the emitters of said first and second transistors, the base of said first transistor being connected to said loop filter to receive said control voltage and the base of said second transistor being biased at a reference voltage, a third transistor connected to the common junction of said first and second resistors, positive feedback means connected from the collector of one of said first and second transistors to said third transistor for controlling the conduction thereof, and a capacitance means connected between the collectors of said first and second transistors for modifying the positive feedback provided by said positive feedback means in response to said control voltage.

6. In a television receiver having a signal processing channel for processing a received composite television signal to provide signals for application to a cathode ray tube display device, deflection apparatus for deflecting an electron beam in said cathode ray tube display device in at least two directions, and synchronizing pulse separating means connected to said signal processing channel for separating synchronizing pulses from a signal in said signal processing channel, a circuit for synchronizing the deflection of the electron beam by said deflection apparatus in at least one of said directions to said synchronizing pulses comprising:

phase detecting means connected to said synchronizing pulse separating means and to said deflection apparatus for providing a control voltage proportional to the phase difference between feedback pulses from said deflection apparatus and said synchronizing pulses; and an oscillator including a transistor means connected to said deflection apparatus for oscillating between first and second operating states, a first transistor having an input connected to said phase detecting means for receiving said control voltage, an output, and an emitter, a second transistor having an input connected to a source of reference voltage, an output, and an emitter, a first resistor connected between the emitter of said first transistor and said transistor means, a second resistor connected between the emitter of said second transistor and said transistor means, a capacitor connected between the outputs of said first and second transistors, and a positive feedback means connected between the output of one of said first and second transistors and said transistor means for causing oscillation of said transistor means.

7. A circuit as defined in claim 6 wherein said phase detecting means includes integrating means connected to receive said feedback pulses for providing a first voltage representative of the average value of said feedback pulses and a second voltage that varies about said average value of said feedback pulses, switching means connected to receive said synchronizing pulses and said first and second voltages for providing an output pulse of a first polarity when said first voltage is less than said second voltage during one of said synchronizing pulses and for providing an output pulse of a second polarity when said first voltage is greater than said second voltage during one of said synchronizing pulses, and means for providing said control voltage connected between said switching means and the input of said first transistor.

8. A circuit as defined in claim 7 wherein said means for providing said control voltage is a loop filter.

9. A circuit as defined in claim 7 wherein said switching means includes third and fourth transistors connected as a differential stage, said first voltage is coupled to said third transistor and said second voltage is coupled to said fourth transistor, and a current control means connected to emitters of said third and fourth transistors and further connected to receive said synchronizing pulses for controlling the current through said third and fourth transistors in response to said synchronizing pulses.

10. A circuit as defined in claim 7 wherein said second voltage has a sawtooth waveform.

* * * * *